United States Patent
Lee

(10) Patent No.: US 11,746,790 B2
(45) Date of Patent: Sep. 5, 2023

(54) MAGNETIC DRIVE AND HYBRID PUMP INCLUDING THE SAME

(71) Applicant: FLUONICS CORP., Wonju-si (KR)

(72) Inventor: Sang Seon Lee, Wonju-si (KR)

(73) Assignee: FLUONICS CORP., Wonju-si (KR)

( * ) Notice: Subject to any disclaimer, the term of this patent is extended or adjusted under 35 U.S.C. 154(b) by 169 days.

(21) Appl. No.: 17/399,474

(22) Filed: Aug. 11, 2021

(65) Prior Publication Data
US 2021/0372409 A1 Dec. 2, 2021

Related U.S. Application Data

(63) Continuation of application No. PCT/KR2021/000407, filed on Jan. 12, 2021.

(30) Foreign Application Priority Data

Jan. 23, 2020 (KR) .................. 10-2020-0009170
Jan. 23, 2020 (KR) .................. 10-2020-0009171
Jan. 23, 2020 (KR) .................. 10-2020-0009172

(51) Int. Cl.
| | | |
|---|---|---|
| F04D 13/02 | (2006.01) | |
| F04D 13/06 | (2006.01) | |
| F04D 29/02 | (2006.01) | |
| F04D 25/02 | (2006.01) | |
| F04D 29/62 | (2006.01) | |
| F04D 29/043 | (2006.01) | |

(52) U.S. Cl.
CPC ......... *F04D 13/024* (2013.01); *F04D 13/025* (2013.01); *F04D 13/027* (2013.01); *F04D 13/06* (2013.01); *F04D 25/026* (2013.01); *F04D 29/026* (2013.01); *F04D 29/043* (2013.01); *F04D 29/628* (2013.01)

(58) Field of Classification Search
CPC .... F04D 13/026; F04D 13/027; F04D 13/025; F04D 29/628; F04D 13/024; F04D 29/026; F04D 25/026; F04D 29/043; F04D 13/06
See application file for complete search history.

(56) References Cited

U.S. PATENT DOCUMENTS

| | | | | |
|---|---|---|---|---|
| 3,520,642 A * | 7/1970 | Fulton | ................... | H02K 49/00 310/104 |
| 4,080,112 A * | 3/1978 | Zimmermann | ....... | F04D 13/025 415/218.1 |
| 4,226,574 A * | 10/1980 | Villette | ................. | F04D 13/025 310/104 |
| 5,017,102 A * | 5/1991 | Shimaguchi | ......... | G21C 15/243 376/404 |
| 5,596,238 A * | 1/1997 | Milnikel | ............... | H02K 49/106 310/104 |
| 5,641,275 A | 6/1997 | Klein et al. | | |

(Continued)

FOREIGN PATENT DOCUMENTS

KR 10-0782041 B1 12/2007

*Primary Examiner* — Peter J Bertheaud

(57) ABSTRACT

A hybrid pump includes an impeller, a magnetic drive configured to control rotation of the impeller, a drive shaft combined with the magnetic drive and a motor. The drive shaft rotates in response to rotation of an axis of the motor, the magnetic drive rotates when the drive shaft rotates, the impeller rotates in response to rotation of the magnetic drive, a drive body of the magnetic drive is formed of plastic, and the drive shaft is formed of metal.

2 Claims, 9 Drawing Sheets

(56) References Cited

U.S. PATENT DOCUMENTS

| | | | | |
|---|---|---|---|---|
| 6,135,728 A * | 10/2000 | Klein | ................... | F04D 29/047 417/420 |
| 7,572,115 B2 * | 8/2009 | Klein | ................... | F04D 13/026 310/104 |
| 8,333,666 B2 * | 12/2012 | Ekberg | ................. | F04D 13/027 310/104 |

* cited by examiner

MAGNETIC DRIVE AND HYBRID PUMP INCLUDING THE SAME

CROSS-REFERENCE TO RELATED APPLICATIONS

This application is a Continuation of pending PCT International Application No. PCT/KR2021/000407, which was filed on Jan. 12, 2021, and which claims priority under 35 U.S.C 119(a) to Korean Patent Application No. 10-2020-0009170 filed with the Korean Intellectual Property Office on Jan. 23, 2020, Korean Patent Application No. 10-2020-0009171 filed with the Korean Intellectual Property Office on Jan. 23, 2020, and Korean Patent Application No. 10-2020-0009172 filed with the Korean Intellectual Property Office on Jan. 23, 2020. The disclosures of the above patent applications are incorporated herein by reference in their entirety.

TECHNICAL FIELD

The present disclosure relates to a magnetic drive and a hybrid pump including the same.

BACKGROUND ART

Conventional casing of a pump is formed of a metal. As a result, it is difficult to process the casing and manufacturing cost of the pump is very expensive.

SUMMARY

The present disclosure is to provide a hybrid pump manufactured simply and a method of manufacturing a magnetic drive in the same.

Additionally, the present disclosure is to provide a magnetic drive including a metal member and a hybrid pump including the same.

Furthermore, the present disclosure is to provide a magnetic drive including a metal member combined with a magnet and a hybrid pump including the same.

A hybrid pump according to one embodiment of the present disclosure includes an impeller; a magnetic drive configured to control rotation of the impeller; a drive shaft combined with the magnetic drive; and a motor. Here, the drive shaft rotates in response to rotation of an axis of the motor, the magnetic drive rotates when the drive shaft rotates, the impeller rotates in response to rotation of the magnetic drive, a drive body of the magnetic drive is formed of plastic, and the drive shaft is formed of metal.

A hybrid pump according to another embodiment of the present disclosure includes an impeller; and a magnetic drive configured to control rotation of the impeller. Here, the magnetic drive has a plastic member and a metal member included in the plastic member.

A method of manufacturing a magnetic drive according to one embodiment of the present disclosure includes inserting a drive shaft formed of metal and a metal member in a mold; and manufacturing a drive body combined with the drive shaft by injecting melted plastic material corresponding to a plastic member into the mold. Here, the metal member is included in the drive body.

In a hybrid pump of the present disclosure, a drive body of a magnetic drive is formed of plastic and a drive shaft combined with the drive body is formed of metal, and thus the magnetic drive may be simply manufactured and be mass-produced.

In the hybrid pump of the present disclosure, the drive body of the magnetic drive is formed of plastic and a metal member is included in the drive body, and so the drive body may be simply manufactured with adequate strength and cost for manufacturing the drive body may reduce because the drive body can be mass-produced.

A magnet is directly adhered to the metal member, and thus the magnet may be more stably fixed to the drive body.

BRIEF DESCRIPTION OF DRAWINGS

Example embodiments of the present disclosure will become more apparent by describing in detail example embodiments of the present disclosure with reference to the accompanying drawings, in which.

DETAILED DESCRIPTION

In the present specification, an expression used in the singular encompasses the expression of the plural, unless it has a clearly different meaning in the context. In the present specification, terms such as "comprising" or "including," etc., should not be interpreted as meaning that all of the elements or operations are necessarily included. That is, some of the elements or operations may not be included, while other additional elements or operations may be further included. Also, terms such as "unit," "module," etc., as used in the present specification may refer to a part for processing at least one function or action and may be implemented as hardware, software, or a combination of hardware and software.

The present disclosure relates to a hybrid pump. In the hybrid pump, a drive body of a magnetic drive may be formed of plastic and a shaft of the magnetic drive may be formed of metal. As a result, it is easy to manufacture the magnetic drive and the magnetic drive may be mass-produced in less time and cost.

Additionally, the drive body of the magnetic drive in the hybrid pump may have a structure that a metal member is included in a plastic member. Accordingly, it is easy to manufacture the magnetic drive with adequate strength.

In one embodiment, a magnet adhered to an internal surface of the drive body may be directly adhered to the metal member.

Hereinafter, various embodiments of the present disclosure will be described in detail with reference to accompanying drawings.

Figure 1:
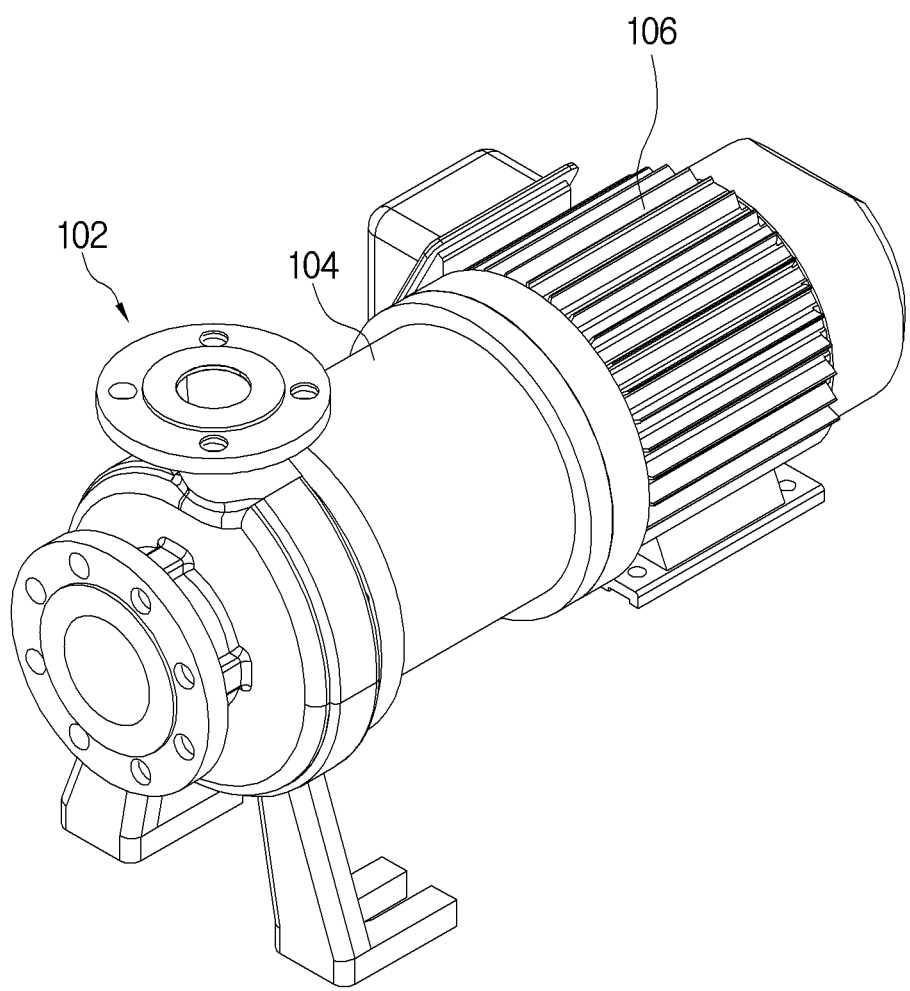
FIG. 1 is a perspective view illustrating a pump according to one embodiment of the present disclosure.
Figure 2:
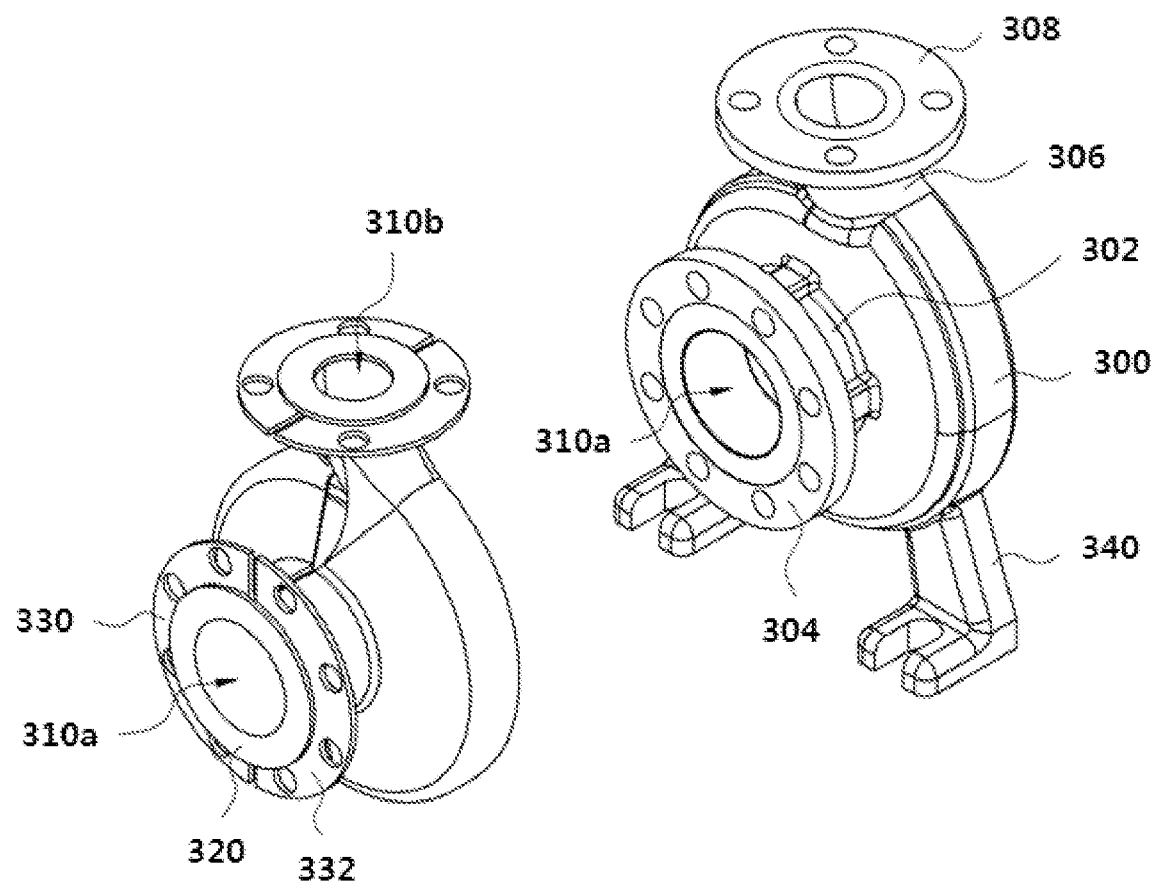
FIG. 2 is a view illustrating decomposition structure of a casing according to one embodiment of the present disclosure.
Figure 3:
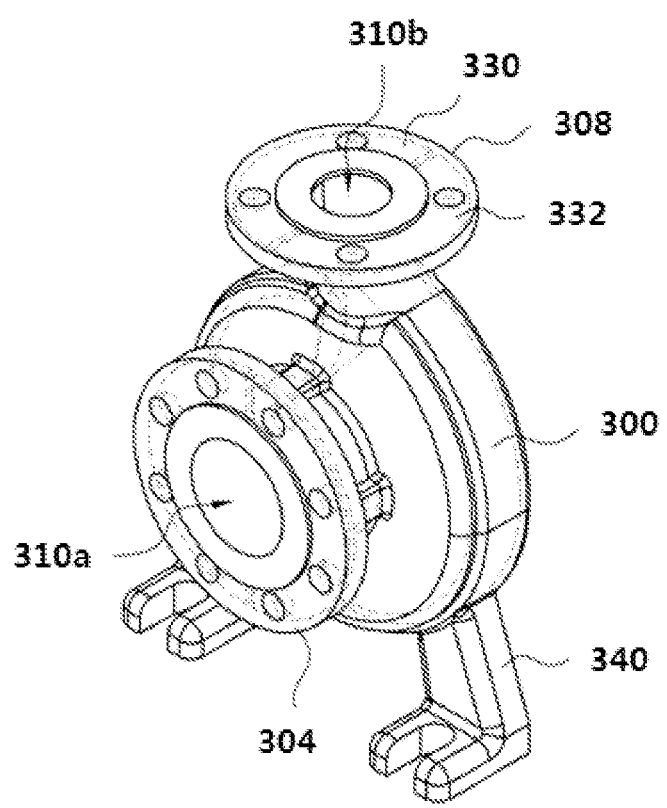
FIG. 3 is a perspective view illustrating a casing of the present disclosure.
Figure 4:
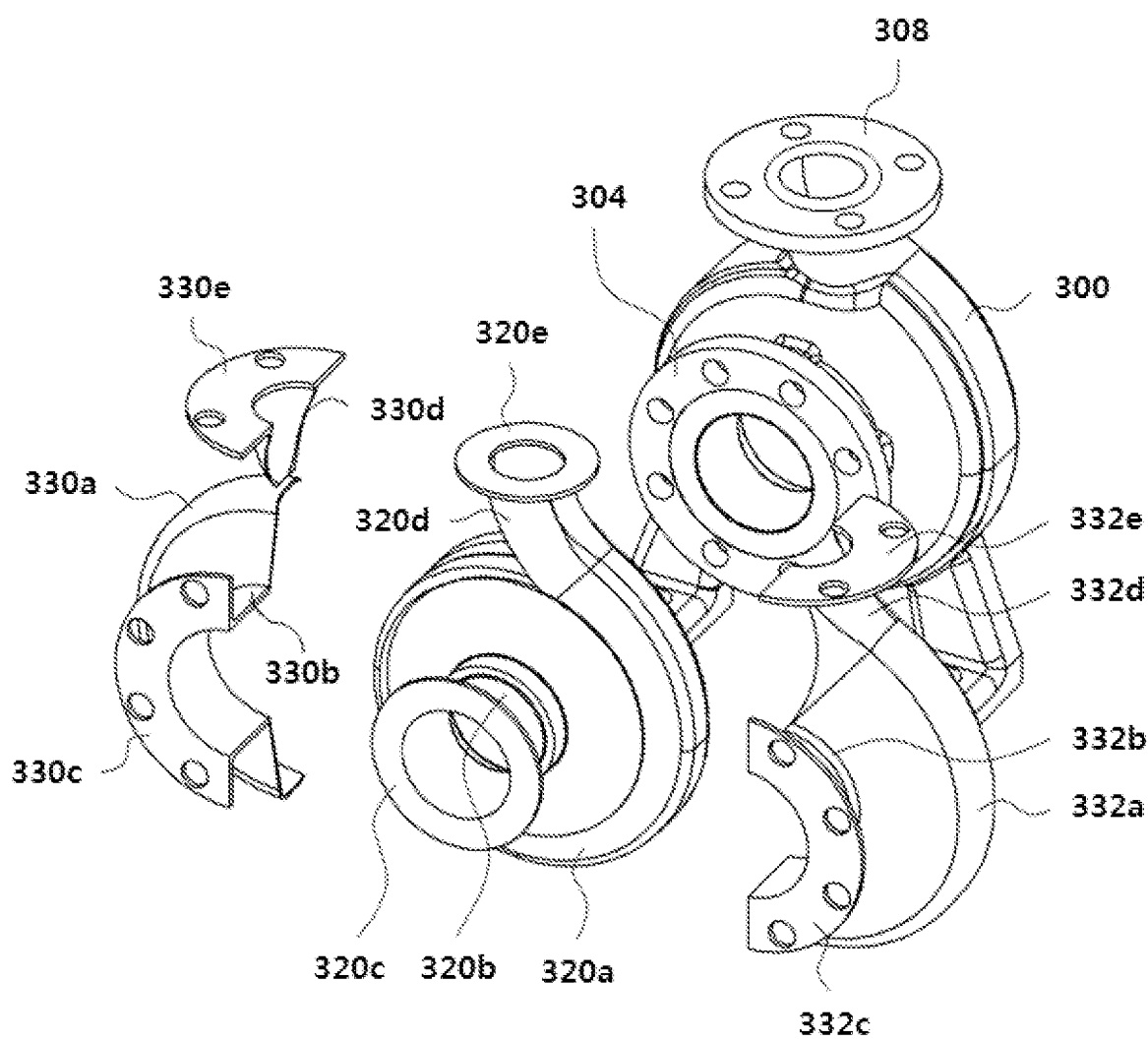
FIG. 4 is a perspective view illustrating decomposition structure of a liner and a metal member according to one embodiment of the present disclosure.
Figure 5:
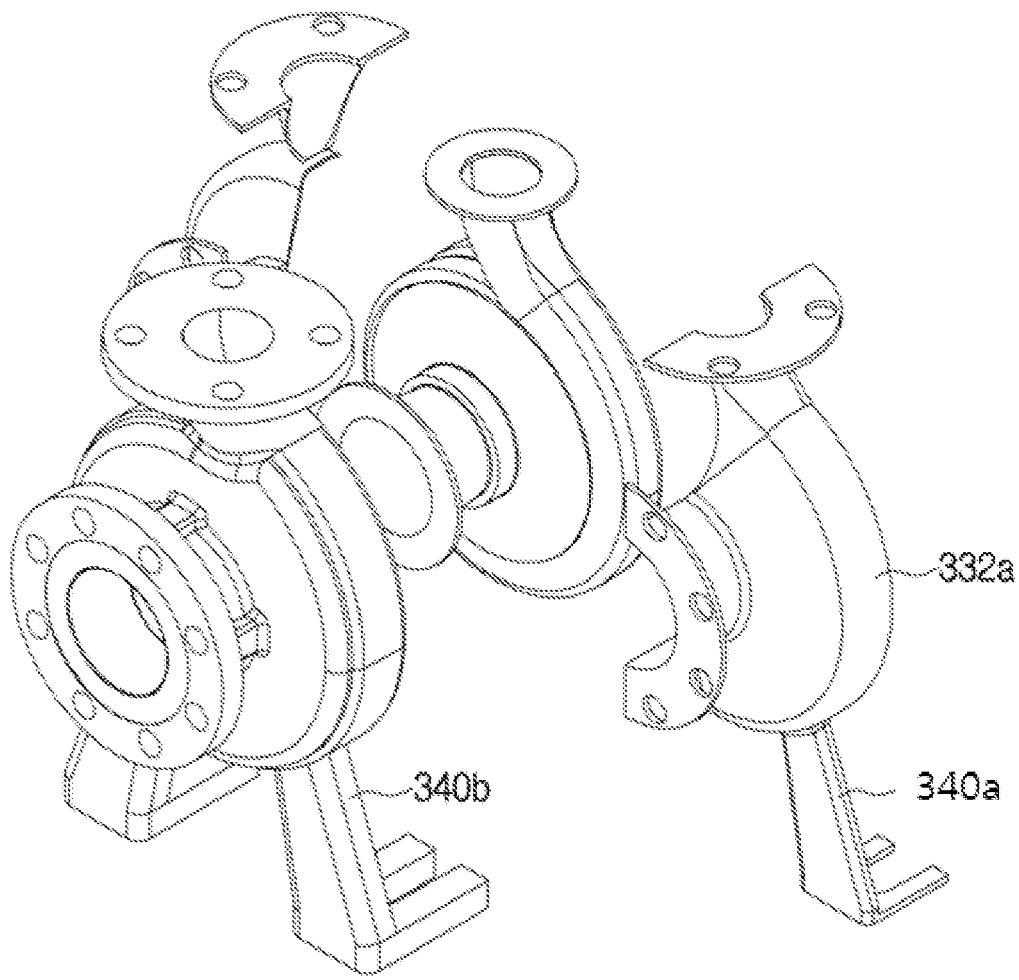
FIG. 5 is a view illustrating decomposition structure of a casing in a pump according to another embodiment of the present disclosure.
Figure 6:
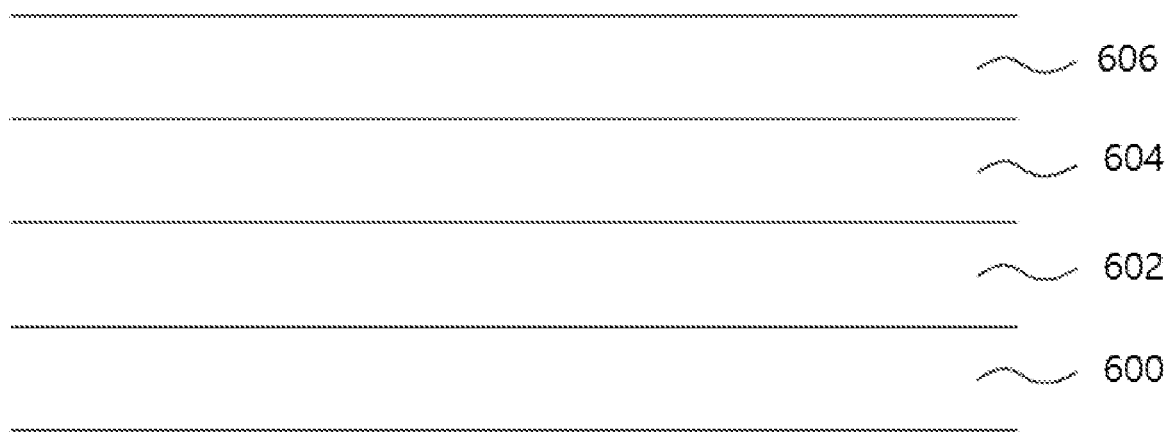
FIG. 6 is a view illustrating schematically section of a pump according to still another embodiment of the present disclosure.
Figure 7:
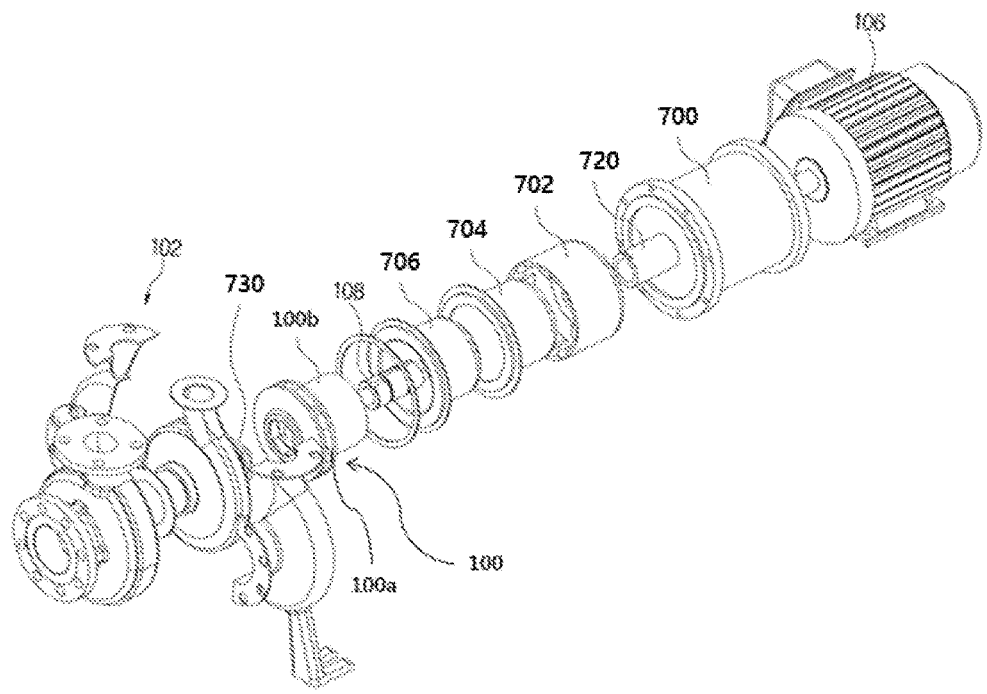
FIG. 7 is a view illustrating detailed decomposition structure of a pump.
Figure 8:
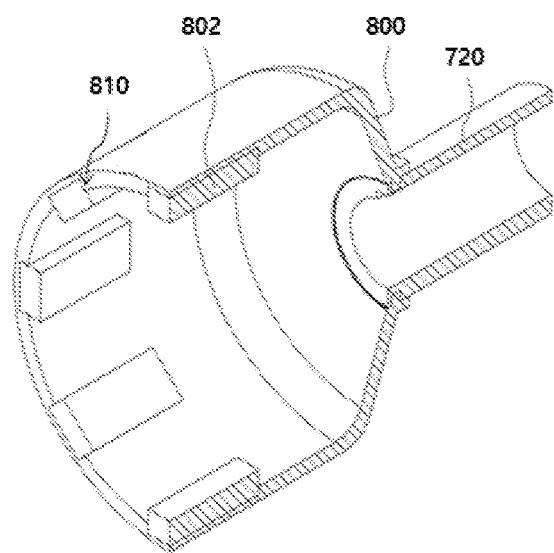
FIG. 8 is a view illustrating section of a magnetic drive according to one embodiment of the present disclosure.

FIG. 1 is a perspective view illustrating a pump according to one embodiment of the present disclosure. FIG. 2 is a view illustrating decomposition structure of a casing according to one embodiment of the present disclosure, FIG. 3 is a perspective view illustrating a casing of the present disclosure, FIG. 4 is a perspective view illustrating decomposition structure of a liner and a metal member according to one embodiment of the present disclosure, and FIG. 5 is a view illustrating decomposition structure of a casing in a pump according to another embodiment of the present disclosure. FIG. 6 is a view illustrating schematically section of a pump according to still another embodiment of the present disclosure, FIG. 7 is a view illustrating detailed decomposition structure of a pump, and FIG. 8 is a view illustrating section of a magnetic drive according to one embodiment of the present disclosure. A left view in FIG. 2 shows composition structure of a liner and a metal member, and a right view in FIG. 2 illustrates composition structure of a body, a liner and a metal member. A front view in FIG. 4 shows decomposition structure of a liner and a metal member, and a back view in FIG. 4 illustrates composition structure of a body, a liner and a metal member.

In FIG. 1, FIG. 2 and FIG. 7, the pump of the present embodiment is a hybrid pump, and it may include an impeller 100, a casing 102, a drive member 104, an electrical motor 106 and a shaft 108.

The impeller 100 may deliver fluid inputted to a first fluid flow space 310a through a piping such as a pipe, etc. to a second fluid flow space 310b. Particularly, the impeller 100 may rotate in a specific velocity and deliver the fluid inputted to the first fluid flow space 310a up to a specific height of the second fluid flow space 310b in response to the rotating. Here, the specific height may depend on a rotation velocity of the impeller 100.

The casing 102 includes a part of the impeller 100 to protect the impeller 100 and may include the first fluid flow space 310a to which the fluid is inputted and the second fluid flow space 310b for delivering the fluid transferred through the first fluid flow space 310a to another piping. Here, the first fluid flow space 310a may cross over the second fluid flow space 310b.

In one embodiment, in the casing 102, a metal member may be included in a plastic member. This will be described below.

The drive member 104 may prevent the fluid flowing through the first fluid flow space 310a from being leaked and control an operation of the impeller 100, especially rotation operation.

The motor 106 controls a power of the pump.

The shaft 108 fixes a central part of the impeller 100. As a result, the impeller 100 may locate in the casing 102 with fixed stably by the shaft 108 and transfer fluid delivered from the first fluid flow space 310a to a second fluid flow space 310b. This impeller 100 may rotate through magnetic reaction as described below.

Hereinafter, the casing 102 and the drive member 104 may be described in sequence.

Firstly, the casing 102 will be described in detail.

In FIG. 2 to FIG. 4, the casing 102 of the pump of the present embodiment may include a body, a liner 320, a metal member having a first sub metal member 330 and a second sub metal member 332 and a supporting member 340.

The body may include a body member 300, a first body connection member 302, a first body flange member 304, a second body connection member 306 and a second body flange member 308, and it may be in a body.

In one embodiment, the body may be formed of a super engineering plastic or an engineering plastic. For example, the body may be made up of a polyphenylene ethers resin composition including a polyphenylene ethers resin and a polystyrene resin. Of course, the body may be formed of a polypropylene, a polyimide, a polysulfone, a poly phenylene sulfide, a polyamide imide, a polyacrylate, a polyether sulfone, a polyether ether ketone, a polyether imide, a liquid crystal polyester, a polyether ketone, etc. and their combination.

The body member 300 has for example a circular shape, but shape of the body member 300 is not limited as the circular shape.

The first body flange member 304 is connected to one end part of the body member 300 through the first body connection member 302 and may be combined with a flange of a piping.

In one embodiment, at least one hole may be formed on a first body flange member 304, a hole may be formed on the flange of the piping, and the first body flange member 304 may be combined with the flange of the piping by passing a fixing member such as a bolt, etc. through the hole of the first body flange member 304 and the hole of the flange of the piping. As a result, the pump may be combined with the piping.

On the other hand, the pump may be combined with every device having a flange, and a combination process may be similar to above combination process.

The second body flange member 308 may be connected to the other end part of the body member 300 through the second body connection member 306 and be combined with a piping. The combination process is similar to the combination process of the first body flange member 304.

The liner 320 is formed in the body and has the same shape as the body or has a shape similar to the body.

In one embodiment, the liner 320 may be formed of a fluorine resin. The fluorine resin means every resin including fluorine in a molecule, and it includes a Polytetrafluoroethylene, PTFE, a Polychlorotrifluoroethylene PCTFE, a Poly-VinyliDene Fluoride PVDF, a Fluorinated ethylene propylene FEP, an Ethyl Tetra Fluoro Ethylene ETFE or a Perfluoroalkoxy alkane PFA, etc. This fluorine resin has excellent heat resistance, excellent chemical resistance, excellent electric insulation, small friction coefficient, and does not have adhesion.

The liner 320 may be in a body and it may include a liner body member 320a, a first liner connection member 320b, a first liner flange member 320c, a second liner connection member 320d and a second liner flange member 320e.

In one embodiment, the first fluid flow space 310a through which the fluid flows may be formed in the first liner flange member 320c, the first liner connection member 320b and the liner body member 320a, and the second fluid flow space 310b may be formed in the second liner flange member 320e, the second liner connection member 320d and the liner body member 320a. That is, the fluid flow space may include the first fluid flow space 310a and the second fluid flow space 310b. Accordingly, the fluid inputted to the first fluid flow space 310a may be outputted through the second fluid flow space 310b.

The first liner flange member 320c may be disposed in the first body flange member 304, and one side of the first liner flange member 320c may be exposed outside.

The second liner flange member 320e may be disposed in the second body flange member 308, and one side of the second liner flange member 320e may be exposed outside.

The metal member may surround the liner 320 and be included in the body, as shown in FIG. 2 and FIG. 4. Here, whole of the metal member is included in the body, and none part of the metal member may be exposed outside. That is, the liner 320 locates in the metal member, and the whole of the metal member may be included in the body. However, a part of the metal member may be exposed at partial of an internal surface of the body flange member.

In one embodiment, the metal member may include a first sub metal member 330 and a second sub metal member 332. For example, the metal member may include two sub metal members 330 and 332 with different shape. Here, the sub metal members 330 and 332 may be independent members.

The first sub metal member 330 may be in a body, cover a part of the liner 320, and include a first sub metal body member 330a, a 1-1 sub metal connection member 330b, a 1-1 sub metal flange member 330c, a 1-2 sub metal connection member 330d and a 1-2 sub metal flange member 330e.

The first sub metal body member 330a may surround a part of the liner body member 320a and have a curved shape.

The 1-1 sub metal flange member 330c may be connected to an end part of the first sub metal body member 330a through the 1-1 sub metal connection member 330b and close to the first liner flange member 320c while it is disposed just beneath the first liner flange member 320c. Particularly, a groove curve line formed at a central part of the 1-1 sub metal flange member 330c may surround a part of the first liner connection member 320b just beneath the first liner flange member 320c, curvature of the groove curve line being the same as or similar to that of the first liner connection member 320b.

In one embodiment, a width of the 1-1 sub metal flange member 330c is higher than that of the first liner flange member 320c. As a result, at least part of the 1-1 sub metal flange member 330c may be projected outside the first liner flange member 320c in a width direction when the 1-1 sub metal flange member 330c surrounds the first liner connection member 320b, as shown in FIG. 2. Here, the first liner flange member 320c may be projected compared to the 1-1 sub metal flange member 330c in a longitudinal direction.

On the other hand, the 1-1 sub metal flange member 330c might surround directly the first liner flange member 320c. In this case, the pump may have unstable structure because a space exists between the liner 320 and the metal member. Accordingly, it is effective that the 1-1 sub metal flange member 330c surrounds the first liner connection member 320b just beneath the first liner flange member 320c while the 1-1 sub metal flange member 330c closes to the first liner flange member 320c.

At least one hole may be formed on the 1-1 sub metal flange member 330c, a fixing member passing through the hole. That is, the fixing member passes the hole of the first body flange member 304 and the hole of the 1-1 sub metal flange member 330c when the pump is combined with the piping.

The 1-2 sub metal flange member 330e may be connected to the other end part of the first sub metal body member 330a through the 1-2 sub metal connection member 330d and close to the second liner flange member 320e while it is disposed just beneath the second liner flange member 320e. Particularly, a groove curve line formed at a central part of the 1-2 sub metal flange member 330e may surround a part of the second liner connection member 320d just beneath the second liner flange member 320e, curvature of the groove curve line being the same as or similar to that of the second liner connection member 320d.

In one embodiment, a width of the 1-2 sub metal flange member 330e is higher than that of the second liner flange member 320e. As a result, at least part of the 1-2 sub metal flange member 330e may be projected outside the second liner flange member 320e in a width direction when the 1-2 sub metal flange member 330e surrounds the second liner connection member 320d, as shown in FIG. 2. Here, the second liner flange member 320e may be projected compared to the 1-2 sub metal flange member 330e in a longitudinal direction.

On the other hand, the 1-2 sub metal flange member 330e might surround directly the second liner flange member 320e. In this case, the pump may have unstable structure because a space exists between the liner 320 and the metal member. Accordingly, it is effective that the 1-2 sub metal flange member 330e surrounds the second liner connection member 320d just beneath the second liner flange member 320e while the 1-2 sub metal flange member 330e closes to the second liner flange member 320e.

At least one hole may be formed on the 1-2 sub metal flange member 330e, a fixing member passing through the hole. That is, the fixing member passes the hole of the second body flange member 308 and the hole of the 1-2 sub metal flange member 330e when the pump is combined with the piping.

On the other hand, the 2-1 sub metal flange member 332c may have a shape of doughnuts cut by half, end sections except the groove curve line may be contacted with end sections of the 1-1 sub metal flange member 330c. That is, the metal member may surround the liner 320 while the end sections of the 1-1 sub metal flange member 330c are contacted with the end sections of the 2-1 sub metal flange member 332c. Here, the 1-1 sub metal flange member 330c has also shape of doughnuts cut by half.

The second sub metal member 332 may be in a body, cover the other part of the liner 320, and include a second sub metal body member 332a, a 2-1 sub metal connection member 332b, a 2-1 sub metal flange member 332c, a 2-2 sub metal connection member 332d and a 2-2 sub metal flange member 332e.

In one embodiment, the first sub metal member 330 may surround a part of the liner 320, and the second sub metal member 332 may surround the other part of the liner 320. That is, the sub metal members 330 and 332 may surround whole of the liner 320.

The second sub metal body member 332a may surround the other part of the liner body member 320a and have a curved shape.

The 2-1 sub metal flange member 332c may be connected to an end part of the second sub metal body member 332a through the 2-1 sub metal connection member 332b and close to the first liner flange member 320c while it is disposed just beneath the first liner flange member 320c.

Particularly, a groove curve line formed at a central part of the 2-1 sub metal flange member 332c may surround a part of the first liner connection member 320b just beneath the first liner flange member 320c, curvature of the groove curve line being the same as or similar to that of the first liner connection member 320b.

In one embodiment, a width of the 2-1 sub metal flange member 332c is higher than that of the first liner flange member 320c. As a result, at least part of the 2-1 sub metal flange member 332c may be projected outside the first liner flange member 320c in a width direction when the 2-1 sub metal flange member 332c surrounds the first liner connection member 320b, as shown in FIG. 2. Here, the first liner flange member 320c may be projected compared to the 2-1 sub metal flange member 332c in a longitudinal direction.

On the other hand, the 2-1 sub metal flange member 332c might surround directly the first liner flange member 320c. In this case, the pump may have unstable structure because a space exists between the liner 320 and the metal member. Accordingly, it is effective that the 2-1 sub metal flange member 332c surrounds the first liner connection member 320b just beneath the first liner flange member 320c while the 2-1 sub metal flange member 332c closes to the first liner flange member 320c.

At least one hole may be formed on the 2-1 sub metal flange member 332c, a fixing member passing through the hole. That is, the fixing member passes the hole of the first body flange member 304 and the hole of the 2-1 sub metal flange member 332c when the pump is combined with the piping.

The 2-2 sub metal flange member 332e may be connected to the other end part of the second sub metal body member 332a through the 2-2 sub metal connection member 332d and close to the second liner flange member 320e while it is disposed just beneath the second liner flange member 320e. Particularly, a groove curve line formed at a center of the 2-2 sub metal flange member 332e may surround a part of the second liner connection member 320d just beneath the second liner flange member 320e, curvature of the groove curve line being the same as or similar to that of the second liner connection member 320d.

In one embodiment, a width of the 2-2 sub metal flange member 332e is higher than that of the second liner flange member 320e. As a result, at least part of the 2-2 sub metal flange member 332e may be projected outside the second liner flange member 320e in a width direction when the 2-2 sub metal flange member 332e surrounds the second liner connection member 320d, as shown in FIG. 2. Here, the second liner flange member 320e may be projected compared to the 2-2 sub metal flange member 332e in a longitudinal direction.

On the other hand, the 2-2 sub metal flange member 332e might surround directly the second liner flange member 320e. In this case, the pump may have unstable structure because a space exists between the liner 320 and the metal member. Accordingly, it is effective that the 2-2 sub metal flange member 332e surrounds the second liner connection member 320d just beneath the second liner flange member 320e while the 2-2 sub metal flange member 332e closes to the second liner flange member 320e.

At least one hole may be formed on the 2-2 sub metal flange member 332e, a fixing member passing through the hole. That is, the fixing member passes the hole of the second body flange member 308 and the hole of the 2-2 sub metal flange member 332e when the pump is combined with the piping.

On the other hand, the 2-2 sub metal flange member 332e may have a shape of doughnuts cut by half, end sections except the groove curve line may be contacted with end sections of the 1-2 sub metal flange member 330e. That is, the metal member may surround the liner 320 while the end sections of the 1-2 sub metal flange member 330e are contacted with the end sections of the 2-2 sub metal flange member 332e. Here, the 1-2 sub metal flange member 330e has also a shape of doughnuts cut by half.

In a manufacture process, the metal member may be formed in the body by using an insert molding. Particularly, the metal member may be included in the body and the liner 320 may be formed in the metal member by insert-molding a structure that the sub metal members 330 and 3322 surround the liner 320 in a plastic which is material of the body.

At least one hole other than the hole for the fixing member may be formed on the flange members 330c, 330e, 332c, 332e of the metal member, so that the metal member is fixed in the body. In this case, melt plastic fills the hole in the insert molding, and thus the metal member may be strongly combined in the body. However, a permeate preventing member (not shown) may be inserted into the hole for the fixing member so that the melted plastic is not filled in the hole, and then the permeate preventing member may be removed after the insert molding is completed.

One or more projection members may be formed on the metal member to more strongly combine the metal member in the body.

To use two separated sub metal members 330 and 332 is for locating the liner 320 in the metal member. It is impossible to insert the liner 320 in the metal member because a width of the flange member 320c or 320e of the liner 320 or a width of the body member 320a is greater than an inner space of the metal member, if the metal member is in a body. Accordingly, two separated sub metal members 330 and 332 are used to locate the liner 320 including the flange member 320c or 320e or the body member 320a higher than the inner space of the metal member in the metal member.

The supporting member 340 may support the body.

In one embodiment, the supporting member 340 may be wholly formed of metal and be longitudinally extended from a lower part of the body member 300 to support the body. In this case, the supporting member 340 may be combined with the body after it is independently manufactured.

In another embodiment, the supporting member 340 may include a metal supporting member 340a and a plastic supporting member 340b as shown in FIG. 5.

The metal supporting member 340a may be longitudinally extended from a lower part of the sub metal member and be formed in a body with the sub metal member.

The plastic supporting member 340b may surround the metal supporting member 340a and be formed together with the metal supporting member 340a when the insert molding is performed. Here, plastic of the plastic supporting member 340b may be formed of above material.

Accordingly, a process of forming the supporting member 340 is simple, and the supporting member 340 may support the casing with adequate force.

Shortly, the two sub metal members 330 and 332 may be included in the body formed of the plastic through the insert molding, while two sub metal members 330 and 332 surround the liner 320. Here, the liner 320 may locate in the metal member.

Distortion may occur to the casing in a direction opposed to a combination direction due to a fixing force of a fixing member when the flange of the casing is combined with a flange of the piping through the fixing member, if the body formed of plastic surrounds directly a liner and the metal member does not surround the liner.

Distortion may not occur or be minimized to the casing because the flange is strengthened though the flange of casing is combined with the flange of a piping through the fixing member, when the metal member is included in the body formed of the plastic while the liner 320 is disposed in the metal member.

Of course, distortion may be prevented when the casing is combined with the piping, if the body is formed of metal and the liner 320 is included in the body. However, it is difficult to process the body and manufacturing cost of the casing may increase sharply. Additionally, corrosion may occur to the casing and lifetime of the casing may get shorter.

Accordingly, the casing of the pump of the present disclosure is formed of the plastic, wherein the metal member locates in the body to reinforce strength.

It is difficult to process precisely the metal member and it is easy to process precisely the plastic. The casing may be realized with a desired shape though the plastic is precisely processed without processing precisely the metal member, when the casing is manufactured. That is, the casing may be easily embodied to have desired shape with low manufacturing cost, and distortion may be minimized when the casing is combined with the piping On the other hand, the flange member of the liner 320, the flange member of the metal member and the flange member of the body form a flange. In view of the flange, a metal member is included in a plastic. As a result, distortion may be minimized though the flange of the pump is combined with the flange of the piping.

In the above description, the metal member comprises two sub metal members 330 and 332 disposed symmetrically with the same shape. However, the metal member may be formed with three or more sub metal members. Here, the liner 320 may be disposed in the sub metal members and the sub metal members may be included in the body. The sub metal members may have the same shape or at least one of the sub metal members may have different shape.

For example, three sub metal members, which are separately disposed by 120° with the same shape, may surround the liner 320. It is efficient that the metal member includes two sub metal members 330 and 332 in consideration of easiness of the process.

In another embodiment, the casing may not include the liner. That is, the casing may include a body and a metal member having a first sub metal member and a second metal member, without the liner.

In still another embodiment, the pump of the present disclosure may include a liner 600, a resin layer 602, a metal member 604 and a body 606 disposed in sequence as shown in FIG. 6. That is, unlike the above embodiment, the resin layer 602 may be disposed between the liner 600 and the metal member 604.

In one embodiment, the resin layer 602 may be formed of the same material as the body 606. The material of the body in the above embodiment may be used as the material of the body 606.

If molding after inserting a structure that the sub metal members surround the liner 700 in a plastic corresponding to the material of the body 606 and the resin layer 602, melted plastic permeates through a space between the liner 600 and the metal member 604 because a space exists between the sub metal members. As a result, the resin layer 602 may be formed between the liner 600 and the metal member 604.

A hole may be formed on a part of the metal member 604 so that the melted plastic is easily permeated between the liner 600 and the metal member 604.

The structure where the resin layer is formed between the liner and the metal member may be also applied to other embodiment.

Next, the drive member 104 will be described in detail.

In FIG. 7, the drive member 104 of the present embodiment may include an adaptor 700, a magnetic drive 702, a strength reinforcement member 704, a rear casing 706 and a drive shaft 720. The drive member 104 may control rotation of the impeller 100 and prevent fluid from being leaked.

The adaptor 700 may connect the casing 102 to the motor 106.

The magnetic drive 702 may be combined with the drive shaft 720 formed at a central part of the adaptor 700. Here, the drive shaft 720 is connected to an axis of the motor 106, and thus the magnetic drive 702 rotates in response to rotation of the axis of the motor 106.

In one embodiment, the magnetic drive 702 may include a drive body 800 and at least one magnet 802, a hole or a home for receiving the strength reinforcement member 704 being formed on the drive body 800 as shown in FIG. 8, and the drive shaft 720 may be connected to an end part of the magnetic drive 702. Accordingly, the magnetic drive 702 rotates when the drive shaft 720 in response to rotation of the axis of the motor 106.

In one embodiment, a home is formed along an outer perimeter surface of an end part of the drive shaft 720, and a protrusion part is formed along an outer perimeter surface of an end part of the drive body 800. In this condition, the drive shaft 720 may be combined with the drive body 800 by inserting the protrusion part into the home of the drive shaft 720. This combination may be formed through following insert molding.

The magnet 802 may be for example a permanent magnet, and it may be combined in a home 810 formed on an internal surface of the drive body 800 as shown in FIG. 8. For example, the magnet 802 may be combined with the drive body 800 through an adhesive in the home 810.

The magnets 802 may be disposed with a circular shape in constant interval, and each of the magnets 802 may be disposed on partial area of the drive body 800 in a longitudinal direction of the drive body 800.

Every of a bottom surface corresponding to the home 810 of the drive body 800 and a surface of the magnet 802 contacted with the bottom surface may be plane or curve. Since the drive body 800 may be formed of plastic as described below, it is efficient that the bottom surface and the surface of the magnet 802 are plane. This is because it is difficult to process the magnet 802 to have curve.

The magnet 802 is adhered in the home 810 of the drive body 800 in FIG. 8. However, the magnet 802 may be adhered to the internal surface of the drive body 800 through adhesive, without the home 810. In this case, the surface of the magnet 802 contacted with the internal surface may have a curved shape because the internal surface of the drive body 800 has a curved shape.

In one embodiment, the drive body 800 may be formed of plastic, and the drive shaft 720 may be formed of metal.

If every of the drive body 800 and the drive shaft 720 is formed of metal, durability of the magnetic drive 702 is excellent, but it is difficult to process precisely the drive body 800 and the drive shaft 720. Furthermore, it is necessary to coat the drive body 800 and the drive shaft 720 for the purpose of preventing corrosion of the drive body 800 and the drive shaft 720, and it should be process precisely the home 810 of the drive body 800 for combination with the magnet 802. As a result, manufacture period of the magnetic drive 702 is long and manufacture cost of the magnetic dive 702 increases.

Accordingly, the pump of the present disclosure may form the drive body 800 with plastic and form the drive shaft 720 with metal. In this case, it is easy to process the magnetic drive 702, manufacture cost of the magnetic drive 720 reduces, and coating for protection of corrosion is not necessary.

In a manufacture process, the drive shaft 720 is manufactured through precise processing, the manufactured drive shaft 720 is inserted into a mold, and then the drive body 800 combined with the drive shaft 720 may be formed by pouring melted plastic material corresponding to the drive body 800 into the mold. That is, the drive body 800 combined with the drive shaft 720 may be manufactured through the insert molding.

Subsequently, the magnet 802 may be adhered in the home 810 formed on the internal surface of the drive body 800.

If the drive body 800 combined with the drive shaft 720 is manufactured through the insert molding, mass production may be realized in less period of time, and it is not necessary to process precisely the home 810 in which the magnet 802 is adhered. Additionally, it is not necessary to perform coating for prevention of corrosion because the drive body 800 is formed of plastic. As a result, manufacture period of the magnetic drive 702 reduces, and so cost for manufacturing reduces and mass production may be realized.

The strength reinforcement member 704 may reinforce strength of the rear casing 706. For example, home or hole is formed on a front surface of the strength reinforcement member 704 as shown in FIG. 7, and the rear casing 706 may be inserted into the home or the hole.

The rear casing 706 may receive a magnet member 100*b* which is a rear part of the impeller 100, thereby preventing leakage of fluid. Particularly, a home for receiving the magnet member 100*b* may be formed on a front surface of the rear casing 706, and thus fluid outputted through the impeller 100 is blocked by the rear casing 706 so that the fluid is not leaked outside.

The impeller 100 may include a fluid delivery member 100*a* for delivering fluid transferred through the first fluid flow space 310*a* to the second fluid flow space 310*b* and the magnet member 100*b* connected to the fluid delivery member 100*a*.

At least one magnet may be formed on an internal surface of the magnet member 100*b*. The magnet may respond to the magnet 802 formed on the internal surface of the drive body 800. As a result, the impeller 100 rotates by magnetic reaction when the drive body 800 rotates in response to rotation of the axis of the motor 106.

In one embodiment, an N pole magnet and an S pole magnet may be alternatively disposed on the internal surface of the drive body 800, and an N pole magnet and an S pole magnet may be alternatively disposed on an internal surface of the magnet member 100*b*.

The shaft 108 fixes a central part of the impeller 100 and may be combined with a ring 730 combined with the casing 102. The ring 730 may prevent driving force and fix the shaft 108.

Briefly, the drive member 104 rotates the impeller 100 through the magnetic reaction, wherein the drive body 800 may be formed of plastic and the drive shaft 720 may be formed of metal. The drive body 800 combined with the drive shaft 720 may be manufactured through the insert molding.

On the other hand, the other elements may be modified as long as the drive body 800 is formed of plastic, the drive shaft 720 is formed of metal and the magnetic drive 702 rotates the impeller 100 through the magnetic reaction.

Figure 9:
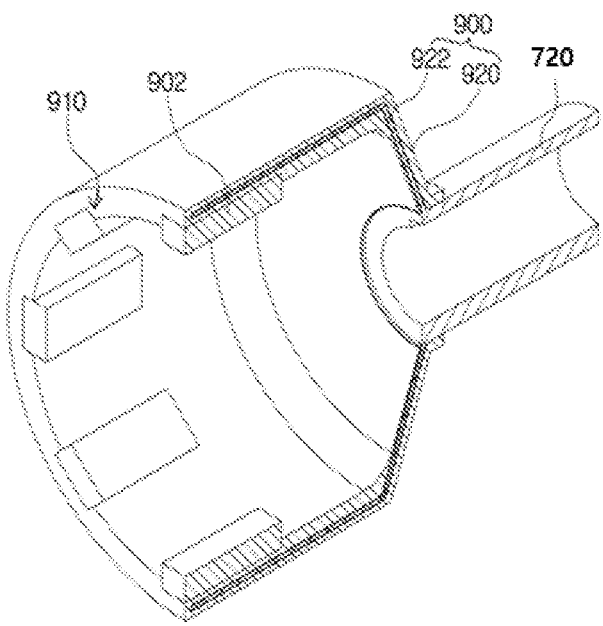
FIG. 9 is a view illustrating section of a magnetic drive according to another embodiment of the present disclosure.
Figure 10:
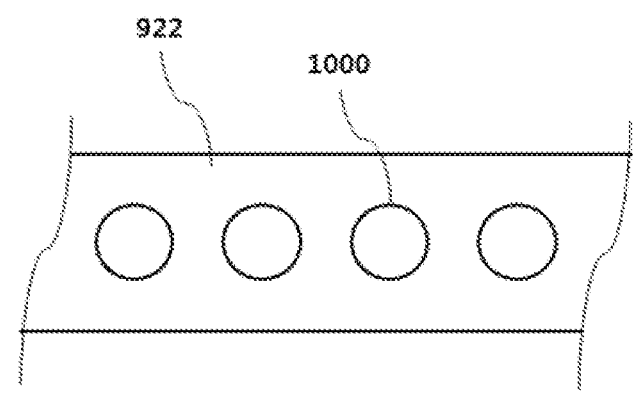
FIG. 10 is a view illustrating a metal member according to one embodiment of the present disclosure.

FIG. 9 is a view illustrating section of a magnetic drive according to another embodiment of the present disclosure, and FIG. 10 is a view illustrating a metal member according to one embodiment of the present disclosure.

In FIG. 9, the magnetic drive 702 may include a drive body 900 and at least one magnet 902, a hole and a home for receiving the strength reinforcement member 704 being formed on the drive body 900 as shown in FIG. 9 and FIG. 10. The drive shaft 720 may be connected to an end part of the magnetic drive 702. Accordingly, the magnetic drive 702 rotates when the drive shaft 720 rotates according to rotation of an axis of the motor 10

The magnet 902 may be combined in a home 910 formed on an internal surface of the drive body 900 as shown in FIG. 9. For example, the magnet 902 may be combined with the drive body 900 by using adhesive, in the home 910.

The magnets 902 may be circularly disposed in a preset interval, and each of the magnets 902 may be disposed on only partial of the drive body 900 in a longitudinal direction of the drive body 900. A bottom surface corresponding to the home 910 of the drive body 900 and a surface of the magnet 902 corresponding to the bottom surface may be plane or curve. It is efficient that the bottom surface and the surface of the magnet 902 are plane because the drive body 900 is formed of plastic as described below. This is because it is difficult to process the magnet 902 in a curved shape.

The magnet 902 is adhered in the home 910 of the drive body 900 in FIG. 8, but the magnet 902 may be adhered to an internal surface of the drive body 900 through an adhesive without the home 910. In this case, the surface of the magnet 902 contacted with the internal surface may have a curved shape because the internal surface of the drive body 900 has a curved shape.

In one embodiment, the drive body 900 has a structure that a metal member 922 is formed in a plastic member 920, and the drive shaft 720 may be formed of metal. That is, the metal member 922 may be included in the drive body 900. Here, the plastic member 920 may be formed of engineering plastic.

Since the metal member 922 is included in the drive body 900, the drive body 900 may have adequate strength, and so the drive body 900 may not be broken down though an external force is applied to the drive body 900.

In one embodiment, the plastic member 920 may have a cylinder shape, and the metal member 922 may be formed along whole of outer circumference surface of the plastic member 920 under the condition that it is included in the plastic member 920. That is, the drive body 900 may have a section shown in FIG. 9 in a longitudinal direction of the drive body 900.

In another embodiment, at least one hole 1000 may be formed on the metal member 922 as shown in FIG. 10. In this case, melted plastic is filled in the hole 1000 in an insert molding, and thus the metal member 922 may be more strongly combined in the plastic member 920.

In a manufacture process, the drive shaft 720 and the metal member 922 connected to the drive shaft 720 are manufactured through precise processing, the manufactured drive shaft 720 and the metal member 922 are inserted into a mold, and then the drive body 900 combined with the drive shaft 720 may be formed by pouring melted plastic material corresponding to the plastic member 920 of the drive body 900 into the mold. That is, the drive body 900 combined with the drive shaft 720 may be manufactured through the insert molding.

Subsequently, the magnet 902 may be adhered in the home 910 formed on the internal surface of the drive body 900.

If the drive body 900 combined with the drive shaft 720 is manufactured through the insert molding, mass production may be realized in less period of time, and it is not necessary to process precisely the home 910 in which the magnet 902 is adhered. Additionally, it is not necessary to perform coating for prevention of corrosion because the plastic member 920 exposed outside of the drive body 900 is formed of plastic. As a result, manufacture period of the magnetic drive 702 reduces, and so cost for manufacturing the magnetic drive 702 reduces and mass production may be realized.

In another embodiment, the drive shaft 720 and the metal member 922 may be separated. In this case, plastic layer exists between the drive shaft 720 and the metal member 922.

In a manufacture process, the drive shaft 720 and the metal member 922 are individually manufactured through precise processing, the drive shaft 720 and the metal member 922 are inserted into a mold, and then the drive body 900 combined with the drive shaft 720 may be formed by pouring melted plastic material corresponding to the plastic member 920 of the drive body 900 into the mold.

Next, the magnet 902 may be adhered in the home 910 formed on the internal surface of the drive body 900.

Shortly, the drive member 104 rotates the impeller 100 by using magnetic reaction. Here, the drive body 900 may have the structure that the metal member 922 is included in the plastic member 920 and the drive shaft 720 may be formed of metal. The drive body 900 combined with the drive shaft 720 may be manufactured through the insert molding.

On the other hand, the other elements may be variously modified as long as the drive body 900 has the structure that the metal member 922 is included in the plastic member 920, the drive shaft 720 is formed of metal and the magnetic drive 702 rotates the impeller 100 by using the magnetic reaction.

Figure 11:
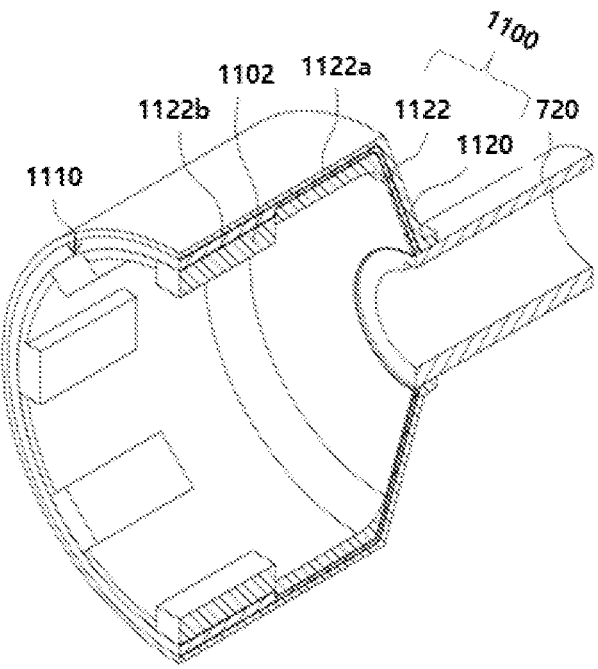
FIG. 11 is a view illustrating section of a magnetic drive according to still another embodiment of the present disclosure.
Figure 12:
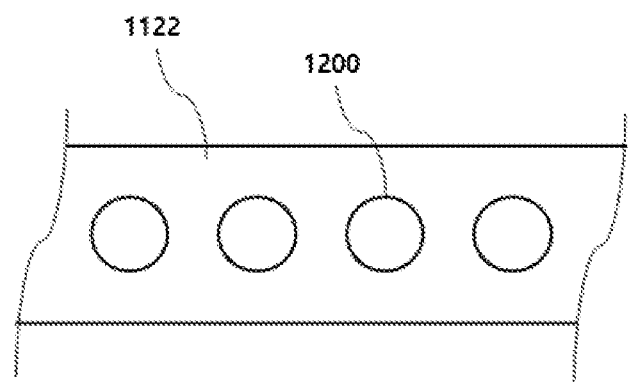
FIG. 12 is a view illustrating structure of a metal member according to one embodiment of the present disclosure.
Figure 13:
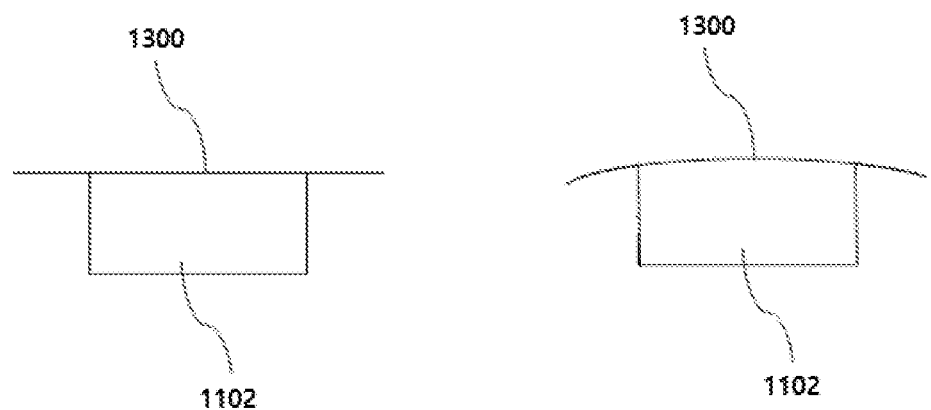
FIG. 13 is a view illustrating schematically combination structure of a metal member and a magnet according to one embodiment of the present disclosure.

FIG. 11 is a view illustrating section of a magnetic drive according to still another embodiment of the present disclosure. FIG. 12 is a view illustrating structure of a metal member according to one embodiment of the present disclosure, and FIG. 13 is a view illustrating schematically combination structure of a metal member and a magnet according to one embodiment of the present disclosure.

In FIG. 11, the magnetic drive 702 may include a drive body 1100 and at least one magnet 1102, a hole and a home for receiving the strength reinforcement member 704 being formed on the drive body 1100 as shown in FIG. 7 and FIG. 11. The drive shaft 720 may be connected to an end part of the magnetic drive 702.

The magnet 1102 may be for example a permanent magnet, and it may be directly combined with a metal member 1122 in a space 1110 formed on an internal surface of the drive body 1100 as shown in FIG. 11. For example, the magnet 1102 may be adhered to a combination part 1122b of the metal member 1122 by using an adhesive, in the space 1110.

In one embodiment, the drive body 1100 may have a structure that the metal member 1122 is included in a plastic member 1120, and the drive shaft 720 may be formed of metal. That is, the metal member 1122 may be included in the drive body 1100. Here, the plastic member 1120 may be formed of engineering plastic.

Since the metal member 1122 is included in the drive body 1100, the drive body 1100 may have adequate strength, and thus the drive body 1100 may be broken down though an external force is applied to the drive body 1100.

In one embodiment, at least one hole 1200 may be formed on the metal member 1122 as shown in FIG. 12. In this case, melted plastic is filled in the hole 1200 when the insert molding is performed, and so the metal member 1122 may be more strongly combined in the plastic member 1120.

In still another embodiment, the space 1110 for exposing the metal member 1122 may be formed on the internal surface of the drive body 1100 as shown in FIG. 11. The magnet 1102 may be adhered to the metal member 1122 in the space 1110. Adhesion when the magnet 1102 is adhered to the metal member 1122 may be greater than that when the magnet 1102 is adhered to plastic.

In one embodiment, the metal member 1122 includes a combination part 1122b to which the magnet 1102 is adhered, thickness of the combination part 1122b being higher than that of the other part 1122a. As a result, the combination part 1122b may endure the weight of the magnet 1102. Cost of the metal member 1122 increases when the other part 1122a has also great thickness. Accordingly, it is efficient to form only combination part 1122b combined with the magnet 1102 with great thickness.

In one embodiment, a part 1300 at which the metal member 1122 and the magnet 1102 are combined may have plane shape as shown in a left view in FIG. 13, and corresponding part of the magnet 1102 may have plane shape.

In another embodiment, the part 1300 at which the metal member 1122 and the magnet 1102 are combined may have a curved shape as shown in a right view of FIG. 13, and corresponding part of the magnet 1102 may have a curved shape.

Shortly, the drive member 104 rotates impeller 100 by using magnet reaction. The drive body 1100 may have the structure that the metal member 1122 is included in a plastic member 1120 and the drive shaft 720 may be formed of a metal. The drive body 1109 combined with the shaft 720 may be manufactured through the insert molding.

On the other hand, the other elements may be variously modified as long as the drive body 1100 has the structure that the metal member 1122 is included in the plastic member 1120, the drive shaft 720 is formed of metal and the magnetic drive 702 rotates the impeller 100 by using the magnetic reaction.

Hereinafter, material of a body of the casing 102 or the drive body will be described in detail.

The body of the casing 102 or the drive body may be formed by mixing a glass fiber with a Polyvinyl Chloride PVC, a polypropylene PP, a Poly Phenylene sulfide PPS, a Polyphthalamide PPA, a Polyamide PA6, a Polyamide PA66, a Polyketone POK or a Polyethylene PE. As a result, strength, impact resistance and mechanical feature of the body of the casing 102 or the drive body may be enhanced.

In another embodiment, the body of the casing 102 or the drive body may be formed by mixing a glass fiber and a carbon fiber with for example, a PVC, a PP, a PPS, a PPA, a PA6, a PA66, a POK or a PE. Accordingly, strength, impact resistance and mechanical feature of the body of the casing 102 or the drive body may be enhanced.

In still another embodiment, the body of the casing 102 or the drive body may be formed by mixing a glass fiber, a carbon fiber and a graphite fiber with for example, a PVC, a PP, a PPS, a PPA, a PA6, a PA66, a POK or a PE. Here, composition of the glass fiber, the carbon fiber and graphite fiber may be 20:10:5. As a result, strength, impact resistance and mechanical feature of the body of the casing 102 or the drive body may be enhanced.

Hereinafter, composition and an experimental result of the body of the casing 102 or the drive body will be described.

In one embodiment, the body of the casing 102 or the drive body may be formed by mixing a PP with a glass fiber. Preferably, the glass fiber has a weight percent higher than 0 weight percent and less than 40 weight percent, and the PP has a weight percent higher than 60 weight percent. Experimental result is shown in following table 1.

TABLE 1

| embodiment | glass fiber weight percent | Tensile strength (Mpa @ 23° C.) [ASTM D638] |
| --- | --- | --- |
| comparison | 0 | 25 |
| 1 | 10 | 54 |
| 2 | 15 | 59 |
| 3 | 20 | 78 |
| 4 | 30 | 83 |
| 5 | 40 | 94 |

It is verified through the above table 1 that tensile strength of the body of the casing 102 or the drive body when the body of the casing 102 or the drive body is formed by mixing the PP with the glass fiber is very greater than that of a body or a drive body formed of only the PP. That is, mechanical property and chemical property may be enhanced. However, it is difficult to manufacture the body of the casing 102 or the drive body to have desired shape because an insert molding feature for manufacturing the body of the casing 102 or the drive body is deteriorated when the glass fiber has a weight percent higher than 40 weight percent. In another embodiment, the body of the casing 102 or the drive body may be formed by mixing a PPS with a glass fiber. Preferably, the glass fiber has a weight percent higher than 0 weight percent and less than 40 weight percent, and the PPS has a weight percent higher than 60 weight percent. Experimental result is shown in following table 2.

TABLE 2

| embodiment | glass fiber weight percent | Tensile strength (Mpa @ 23° C.) [ASTM D638] |
| --- | --- | --- |
| comparison | 0 | 70 |
| 1 | 30 | 140 |
| 2 | 40 | 200 |

It is verified through the above table 2 that tensile strength of the body of the casing 102 or the drive body when the body of the casing 102 or the drive body is formed by mixing the PPS with the glass fiber is very greater than that of a body or a drive body formed of only the PPS. That is, mechanical property and chemical property may be enhanced, and thus light and strong body of the casing 102 or drive body may be formed. However, it is difficult to manufacture the body of the casing 102 or the drive body to have desired shape because an insert molding feature for manufacturing the body of the casing 102 or the drive body is deteriorated when the glass fiber has a weight percent higher than 40 weight percent. In still another embodiment, the body of the casing 102 or the drive body may be formed by mixing a PPA with a glass fiber. Preferably, the glass fiber has a weight percent higher than 0 weight percent and less than 55 weight percent, and the PPA has a weight percent higher than 45 weight percent. Experimental result is shown in following table 3.

TABLE 3

| embodiment | glass fiber weight percent | Tensile strength (Mpa @ 23° C.) [ASTM D638] |
| --- | --- | --- |
| comparison | 0 | 105 |
| 1 | 25 | 170 |
| 2 | 35 | 210 |
| 3 | 45 | 250 |
| 4 | 55 | 270 |

It is verified through the above table 3 that tensile strength of the body of the casing 102 or the drive body when the body of the casing 102 or the drive body is formed by mixing the PPA with the glass fiber is very greater than that of a body or a drive body formed of only the PPA. That is, mechanical property and chemical property may be enhanced, and thus light and strong body of the casing 102 or drive body may be formed. However, it is difficult to manufacture the body of the casing 102 or the drive body to have desired shape because an insert molding feature for manufacturing the body of the casing 102 or the drive body is deteriorated when the glass fiber has a weight percent higher than 55 weight percent. In still another embodiment, the body of the casing 102 or the drive body may be formed by mixing a PA6 with a glass fiber. Preferably, the glass fiber has a weight percent higher than 0 weight percent and less than 50 weight percent, and the PA6 has a weight percent higher than 50 weight percent. Experimental result is shown in following table 4.

TABLE 4

| embodiment | glass fiber weight percent | Tensile strength (Mpa @ 23° C.) [ASTM D638] |
| --- | --- | --- |
| comparison | 0 | 70 |
| 1 | 15 | 125 |
| 2 | 20 | 145 |
| 3 | 30 | 170 |
| 4 | 33 | 180 |
| 5 | 35 | 185 |
| 6 | 40 | 192 |
| 7 | 45 | 200 |
| 8 | 50 | 220 |

It is verified through the above table 4 that tensile strength of the body of the casing 102 or the drive body when the body of the casing 102 or the drive body is formed by mixing the PA6 with the glass fiber is very greater than that of a body or a drive body formed of only the PA6. That is, mechanical property and chemical property may be enhanced, and thus light and strong body of the casing 102 or drive body may be formed. However, it is difficult to manufacture the body of the casing 102 or the drive body to have desired shape because an insert molding feature for manufacturing the body of the casing 102 or the drive body is deteriorated when the glass fiber has a weight percent higher than 50 weight percent. In still another embodiment, the body of the casing 102 or the drive body may be formed by mixing a PA66 with a glass fiber. Preferably, the glass fiber has a weight percent higher than 0 weight percent and less than 50 weight percent, and the PA66 has a weight percent higher than 50 weight percent. Experimental result is shown in following table 5.

TABLE 5

| embodiment | glass fiber weight percent | Tensile strength (Mpa @ 23° C.) [ASTM D638] |
|---|---|---|
| comparison | 0 | 80 |
| 1 | 25 | 165 |
| 2 | 30 | 186 |
| 3 | 33 | 196 |
| 4 | 35 | 200 |
| 5 | 50 | 245 |

It is verified through the above table 5 that tensile strength of the body of the casing 102 or the drive body when the body of the casing 102 or the drive body is formed by mixing the PA66 with the glass fiber is very greater than that of a body or a drive body formed of only the PA66. That is, mechanical property and chemical property may be enhanced, and thus light and strong body of the casing 102 or drive body may be formed. However, it is difficult to manufacture the body of the casing 102 or the drive body to have desired shape because an insert molding feature for manufacturing the body of the casing 102 or the drive body is deteriorated when the glass fiber has a weight percent higher than 50 weight percent. In still another embodiment, the body of the casing 102 or the drive body may be formed by mixing a POK with a glass fiber. Preferably, the glass fiber has a weight percent higher than 0 weight percent and less than 40 weight percent, and the POK has a weight percent higher than 60 weight percent. Experimental result is shown in following table 6.

TABLE 6

| embodiment | glass fiber weight percent | Tensile strength (Mpa @ 23° C.) [ASTM D638] |
|---|---|---|
| comparison | 0 | 60 |
| 1 | 15 | 100 |
| 2 | 20 | 125 |
| 3 | 30 | 140 |
| 4 | 40 | 165 |

It is verified through the above table 6 that tensile strength of the body of the casing 102 or the drive body when the body of the casing 102 or the drive body is formed by mixing the POK with the glass fiber is very greater than that of a body or a drive body formed with only the POK. That is, mechanical property and chemical property may be enhanced, and thus light and strong body of the casing 102 or drive body may be formed. However, it is difficult to manufacture the body of the casing 102 or the drive body to have desired shape because an insert molding feature for manufacturing the body of the casing 102 or the drive body is deteriorated when the glass fiber has a weight percent higher than 40 weight percent.

Components in the embodiments described above can be easily understood from the perspective of processes. That is, each component can also be understood as an individual process. Likewise, processes in the embodiments described above can be easily understood from the perspective of components.

The embodiments of the present disclosure described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

The invention claimed is:

1. A hybrid pump comprising:
an impeller;
a magnetic drive configured to control rotation of the impeller;
a drive shaft combined with the magnetic drive;
a motor;
a rear casing of the impeller comprising a home formed on a front surface of the rear casing, a magnet member being received in the home; and
a strength reinforcement member configured to receive the rear casing to reinforce strength,
wherein the magnetic drive has a plastic member and a metal member included in the plastic member,
wherein the drive shaft rotates along an axis of the motor, the magnetic drive rotates when the drive shaft rotates, and the impeller rotates in response to rotation of the magnetic drive,
wherein the drive shaft is formed of metal,
wherein a magnetic drive home is formed on an internal surface of the plastic member and a first magnet is adhered in the magnetic drive home,
wherein the impeller includes a fluid delivery member for delivering fluid inputted through a first fluid flow space to a second fluid flow space and the magnet member connected to the fluid delivery member, one or more second magnets being formed on the internal surface of the magnet member,
wherein the impeller rotates in response to reaction of the first magnet and the second magnet, and
wherein the rear casing prevents leakage of the fluid.

2. The hybrid pump of claim 1, wherein the plastic member is formed of engineering plastic.

* * * * *